Dec. 11, 1962  R. C. RISNER  3,068,037
AUTOMOBILE CARRIERS
Filed May 14, 1959  5 Sheets-Sheet 1
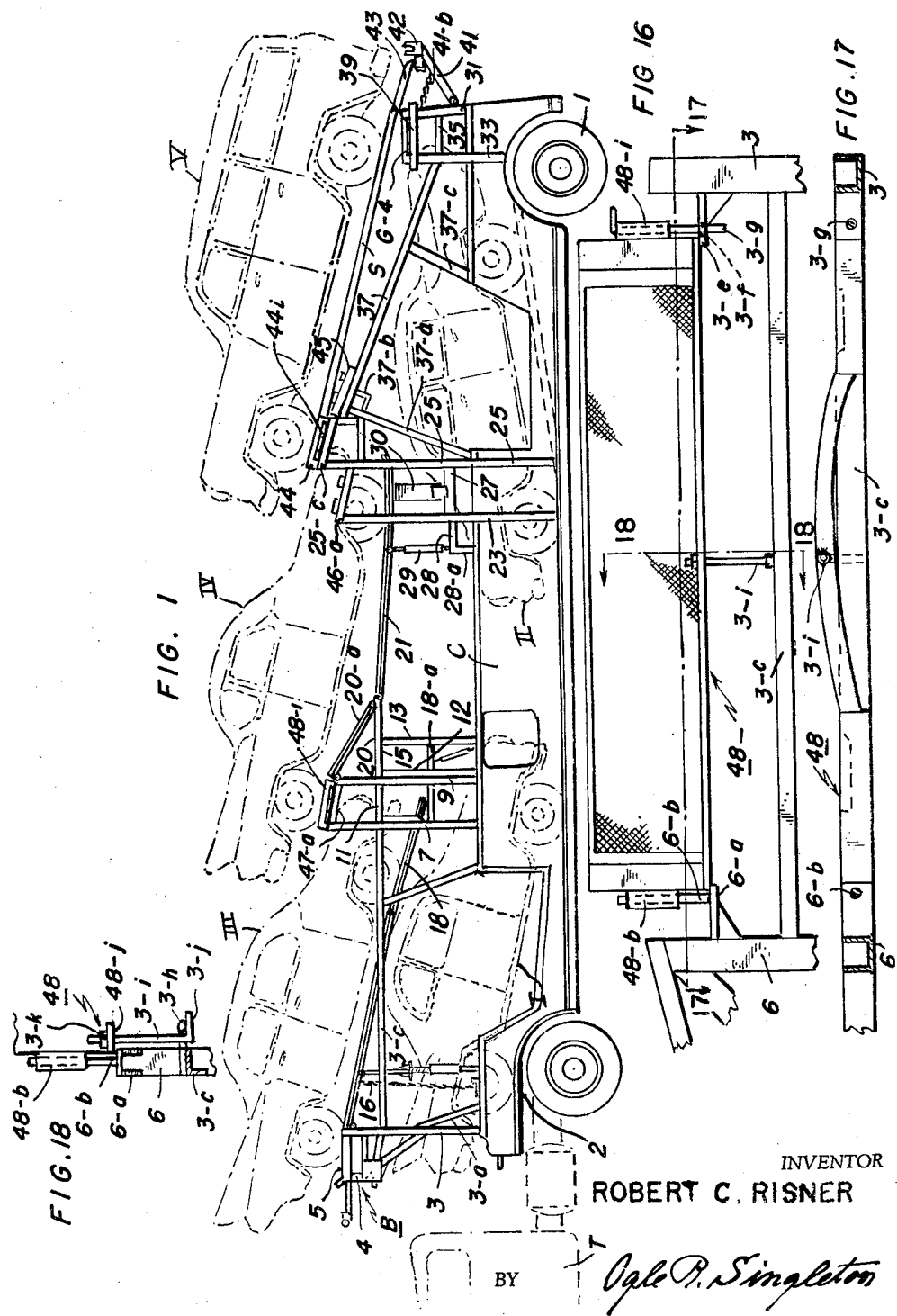
INVENTOR
ROBERT C. RISNER
BY
ATTORNEY

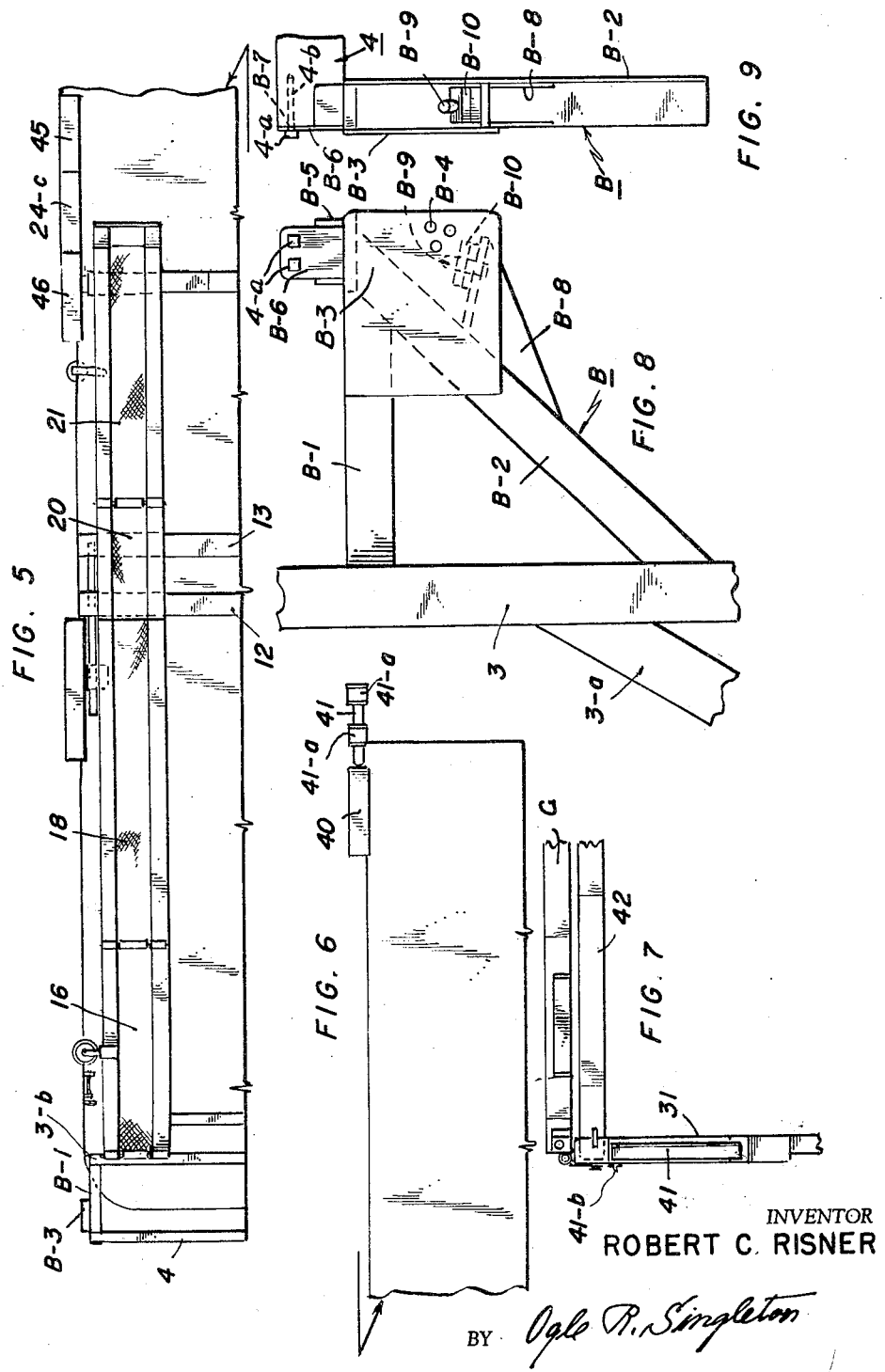

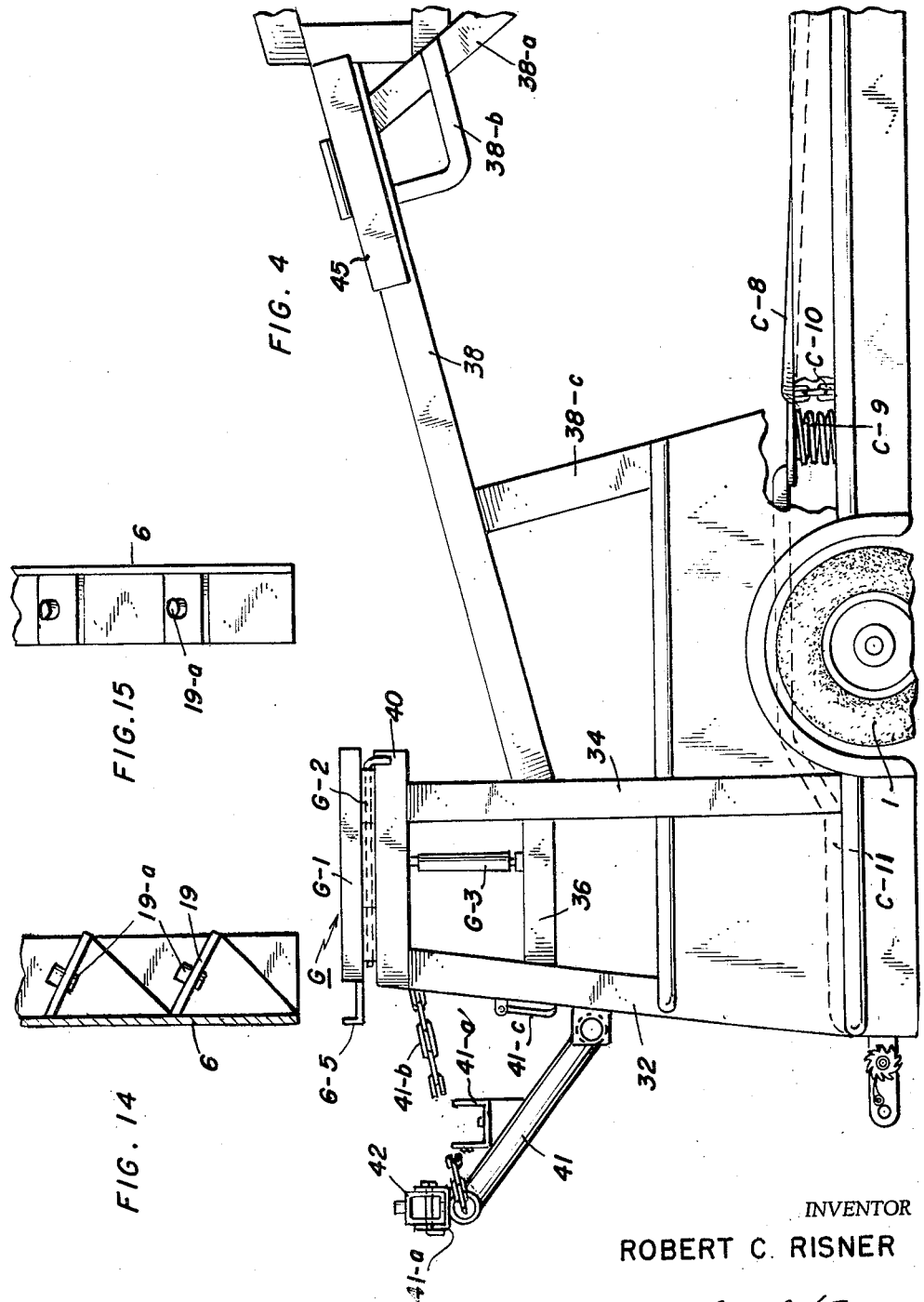

Dec. 11, 1962  R. C. RISNER  3,068,037
AUTOMOBILE CARRIERS
Filed May 14, 1959  5 Sheets-Sheet 4
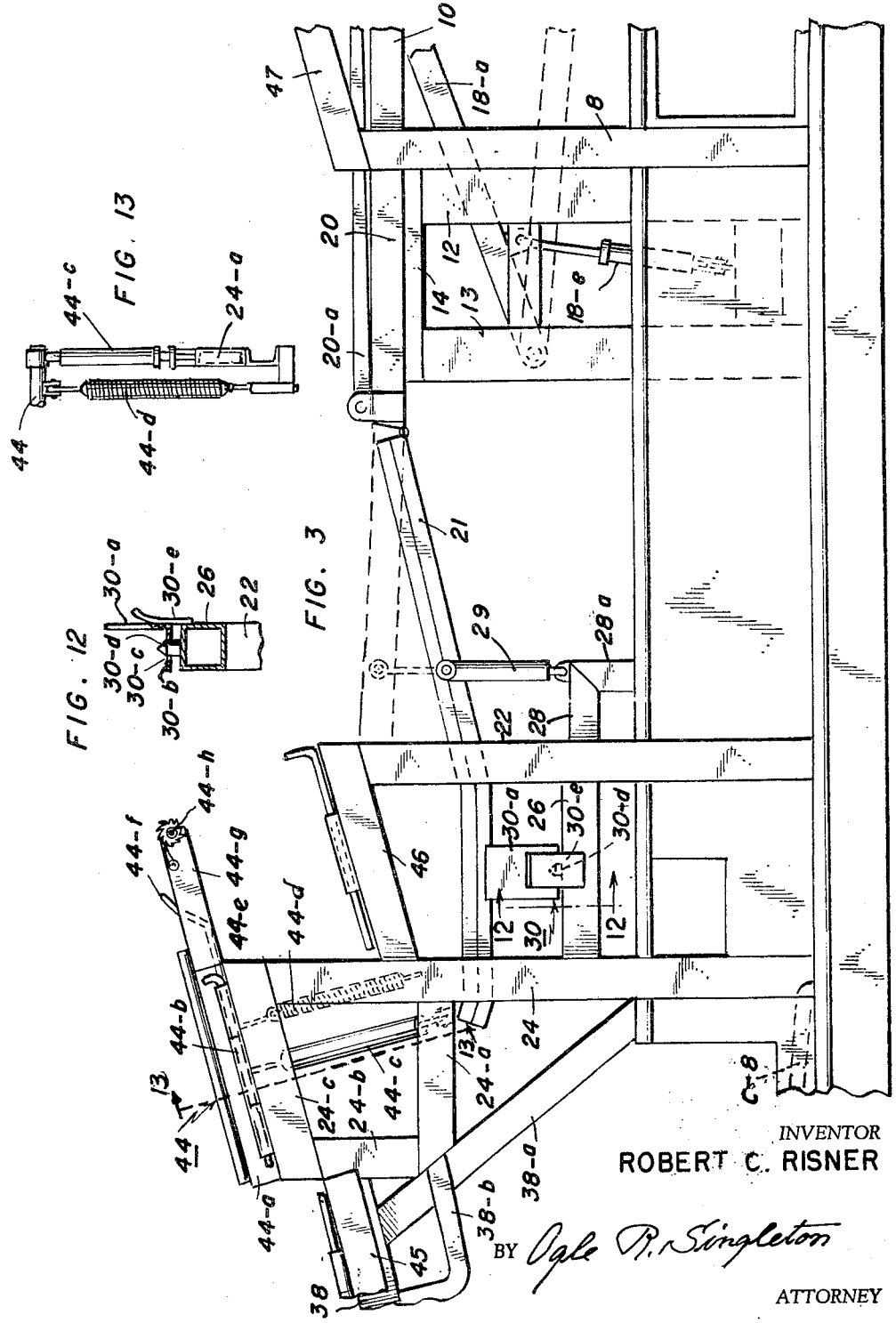
INVENTOR
ROBERT C. RISNER
BY Ogle R. Singleton
ATTORNEY

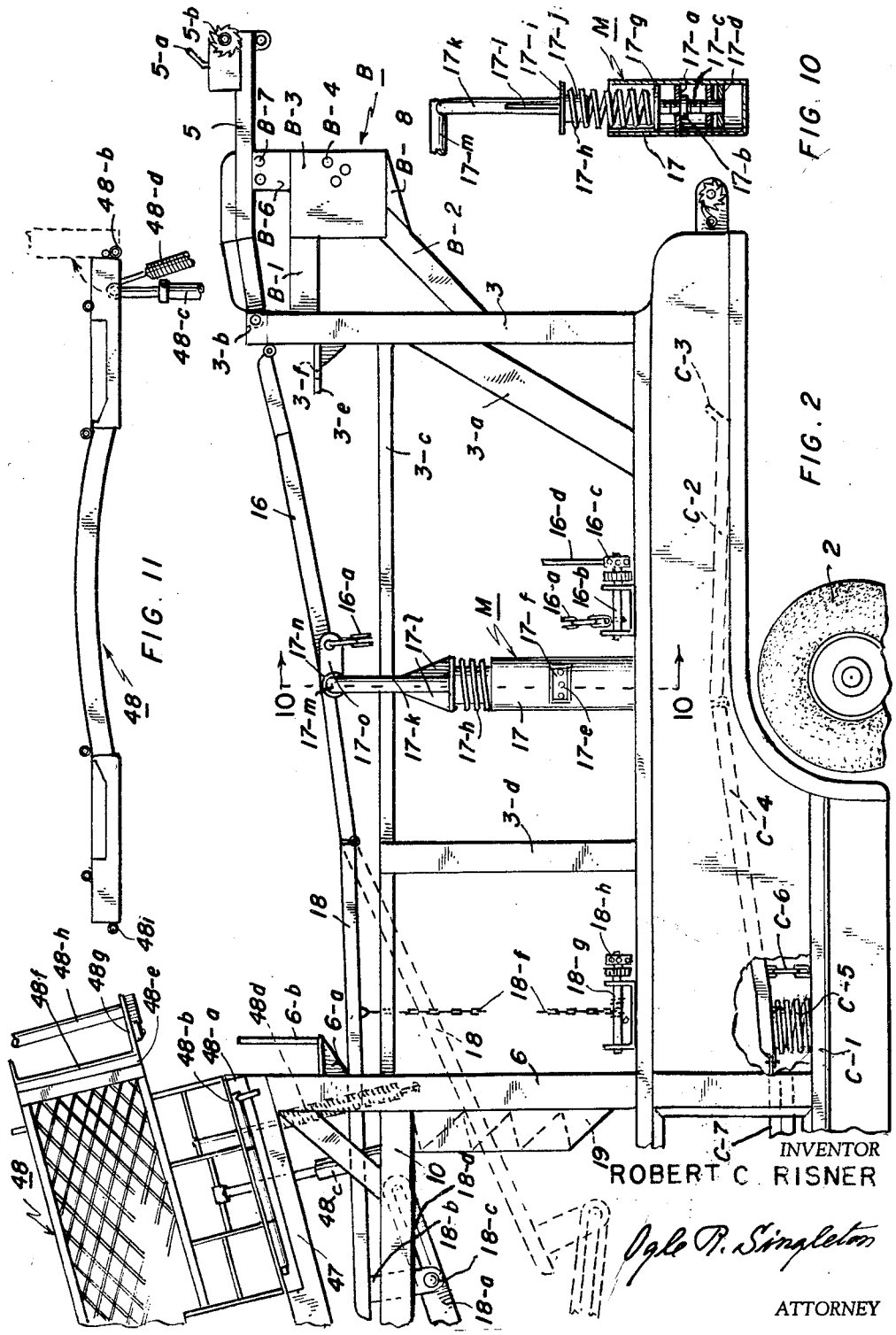

United States Patent Office 3,068,037
Patented Dec. 11, 1962

3,068,037
AUTOMOBILE CARRIERS
Robert C. Risner, 8109 Conduit Road, Towson 4, Md.
Filed May 14, 1959, Ser. No. 813,096
2 Claims. (Cl. 296—1)

My invention consists in a new and useful improvement in automobile carriers and constitutes a considerable improvement over the carrier disclosed and claimed in my co-pending application Serial Number 695,952. The carrier hereinafter disclosed and claimed is designed, as are all my carriers, to carry five automobiles on a single trainer. The improved features hereinafter disclosed and claimed are: (1) there are three sets of supports for the rear bridge so that the bridge can be adjusted relative the rear gate for adjustment of the skids therebetween according to the wheel base of the particular vehicle to be loaded on the bridge and the skids; (2) the lower trackway on the chassis of the trailer has four spring-mounted portions; (3) the forward bridge has novel means for carrying the bridge securely fixed on the trailer when not in use; (4) the forward end portions of the intermediate trackway are hinged for vertical adjustment on carrying means on supports at the front end of the chassis: (5) the intermediate trackway has a resiliently supported movable section hinged to said supports, and a second movable section hinged to said first movable section, with hydraulically operated levers for adjusting said second section; and (6) adjustable supports extending rearwardly of the gate carry removable adjustable tracks.

The foregoing features materially improve the capacity of the trailer because (1) by mounting the rear bridge on a selected one of its three sets of supports, and use of the skids from the bridge to the gate, the upper trackway may be properly dimensioned to support the particular vehicle to be loaded on the upper trackway; (2) by use of the spring-mounted portions of the lower trackway, suitable accommodation is provided for both of the two particular vehicles loaded on the lower trackway; (3) by use of the carrying means for the unused forward bridge, a greatly increased space is provided on the intermediate trackway for the particular vehicle to be loaded thereon; (4) by selective adjustment of the hinged forward end portions of the intermediate trackway, a variety of arrangements of the portions can be effected to properly position the forwardly projecting end of the particular vehicle to be loaded at the forward end of the intermediate trackway; (5) by selective adjustment of the two movable sections of the intermediate trackway, a variety of arrangements of the portions can be effected to accommodate the rearwardly projecting end of the particular vehicle to be loaded at the forward end of the intermediate trackway; and (6) by selective adjustment of the supports rearwardly of the gate, a variety of arrangements of the removable adjustable tracks can be effected to properly position the rearwardly extending end of the particular vehicle to be loaded on the upper trackway.

As will further appear, the carrier hereinafter disclosed and claimed is an all-purpose carrier, designed to be loaded with any combination of automobiles, station wagons, pick-up trucks, buses, ambulances and hearses.

While I illustrate in the drawings and hereinafter fully describe one specific embodiment of my invention, it is to be distinctly understood that I do not consider my invention to be limited to said embodiment but refer for its scope to the claims appended hereto.

In the drawings:

FIG. 1 is an elevation of the left side of the trailer;

FIG. 2 is an enlarged, fragmentary elevation of the forward portion of the right side of the trailer;

FIG. 3 is an enlarged, fragmentary elevation of the middle portion of the right side of the trailer;

FIG. 4 is an enlarged, fragmentary elevation of the rear portion of the right side of the trailer;

FIG. 5 is an enlarged, fragmentary, top plan of the forward and middle portions of the trailer, the two bridges and the forward tracks being removed;

FIG. 6 is an enlarged, fragmentary, top plan of the rear portion of the trailer, the rear gate being removed;

FIG. 7 is a fragmentary, rear elevation of the rear gate;

FIG. 8 is a greatly enlarged, fragmentary, side elevation of one of the supports for the forward tracks;

FIG. 9 is a front elevation of the structure of FIG. 8;

FIG. 10 is a vertical section on the line 10—10 of FIG. 2 in the direction of the arrows;

FIG. 11 is an enlarged, rear elevation of the forward bridge of FIG. 2;

FIG. 12 is a vertical section on the line 12—12 of FIG. 3 in the direction of the arrows;

FIG. 13 is a front elevation on the line 13—13 of FIG. 3 in the direction of the arrows;

FIG. 14 is a fragmentary, enlarged side elevation of the supports below the forward bridge, for the hinged tracks;

FIG. 15 is a fragmentary, enlarged, rear elevation of the supports of FIG. 14;

FIG. 16 is a side, fragmentary elevation of the forward bridge mounted in unused position;

FIG. 17 is a horizontal section on the line 17—17 of FIG. 16 in the direction of the arrows;

FIG. 18 is a vertical section on the line 18—18 of FIG. 16 in the direction of the arrows.

As shown in the drawings, my improved trailer has a chassis C having a pair of rear wheels 1 (FIGS. 1 and 4) and the usual coupling means 2 for attaching the trailer to the usual tractor T. The floor C–1 of the trailer has a suitable pair of tracks C–2 fixed at the forward end of the chassis C (FIG. 2), with upturned flanges C–3 at their forward ends, respectively. Suitably hinged to the tracks C–2, at their rear ends, is a pair of tracks C–4 extending rearwardly from the tracks C–2, respectively. These tracks C–4 slope downwardly and are carried at their rear ends by coil springs C–5 mounted on the floor C–1. Each track C–4 is attached to the floor C–1 by a chain C–6 to limit the upward movement of the track C–4.

A second pair of fixed tracks C–7 on the floor C–1 extend rearwardly from the rear ends of the tracks C–4. These tracks C–7 extend rearwardly somewhat beyond the mid-point in the length of the chassis C. Adjacent the rear ends of the tracks C–7, there is a pair of tracks C–8 having their forward ends pivoted on the floor C–1. These tracks C–8 slope upwardly (FIGS. 3 and 4) and their rear ends are mounted on coil springs C–9 mounted on the floor C–1. Each track C–8 is attached to the floor C–1 by a chain C–10 to limit the upward movement of the track C–8. A pair of tracks C–11, mounted on the floor C–1, extend from the tracks C–8 to the rear end of the trailer.

From the foregoing, it will be understood that the tracks C–2, C–4, C–7, C–8 and C–11 co-act to provide a continuous, lower trackway throughout the length of the chassis C.

It is to be understood that a pair of the usual loading skids (not shown) can be placed upon the ground to the rear of the trailer and attached by any suitable means to the rear ends of the tracks C–11 for driving the two automobiles onto the trailer.

Adjacent its forward end, the chassis C has mounted thereon a pair of posts 3 (FIGS. 1 and 2), on the sides of the chassis C, respectively, having braces 3–a on their rear sides. A transverse beam 3–b connects the tops of the posts 3, giving stability thereto (FIGS. 2 and 5). On the forward side of each post 3, there is mounted a bracket B (FIGS. 1, 2, 5, 8 and 9). Each bracket B has a strut B–1 extending forwardly from the post 3 with a brace B–2 between the post 3 and the outer end of the strut B–1. A rectangular plate B–3 is carried by the strut B–1 and brace B–2 and has three bolt holes B–4. A socket B–5 is mounted on the top of the forward end of the strut B–1 above the upper end of the brace B–2, inboard of the plate B–3, and has an upstanding ear B–6 with bolt holes B–7. The sockets B–5 of the two brackets B carry a removable transverse beam 4 (FIG. 5). For each bracket B, there is a lug B–8 (FIGS. 2, 8 and 9) carrying an upstanding pin B–9 with removable spacer blocks B–10. These lugs B–8 are provided for carrying the beam 4 in adjusted lower positions below the sockets B–5. A pair of removable tracks 5 are pivoted on the forward side of the transverse beam 3–b, adjacent the posts 3, respectively (FIGS. 1 and 2), and are carried in adjusted positions by the removable, adjustable beam 4. It is obvious that the beam 4 can be temporarily fixed in adjusted positions by bolts 4–a passed through either holes B–4 or B–7 into holes 4–b of the beam 4 (FIG. 9). Each track 5 has, on its forward end, an upturned stop flange 5–a, and a suitably journaled ratchet-controlled shaft 5–b for the tie-down chains for the automobile on the tracks 5.

The chassis C has mounted thereon a pair of posts 6 and 7, on the sides of the chassis C, respectively, adjacent the forward ends of the tracks C–7 (FIG. 2). A pair of horizontal struts 3–c connect the posts 3 with the posts 6 and 7, respectively (FIGS. 1 and 2). A vertical post 3–d mounted on the chassis C supports the strut 3–c (FIG. 2).

A pair of posts 8 and 9 are mounted on the sides of the chassis C, respectively, spaced rearwardly of the posts 6 and 7, respectively. The posts 6 and 8 are connected by a strut 10 (FIGS. 2 and 3) and the posts 7 and 9 are connected by a strut 11 (FIG. 1). Adjacent the posts 8 and 9 and rearwardly thereof, there is a pair of relatively spaced, transverse arches 12 and 13 mounted on the chassis C and spanning the trailer. These arches 12 and 13 are connected at their tops by struts 14 and 15.

From the foregoing description of the fixed elements 3, 6 to 15, it will be understood that my improved trailer is provided with a stable structure carried by the chassis C and extending from the forward end to substantially the mid-point of the length of the chassis C.

A pair of tracks 16 is pivoted on the rear faces of the posts 3, respectively (FIGS. 1 and 2). This pair of tracks 16 is resiliently supported by spring members M (FIGS. 1, 2 and 10), respectively. Each member M has a tubular base 17 mounted on the chassis C, having therein a spider 17–a carrying a threaded journal 17–b in which is threaded a shaft 17–c having fixed on its lower end a collar 17–d with a plurality of sockets 17–e adapted to receive a suitable tool (not shown) which can be passed through an opening 17–f in the shell 17 and into the sockets 17–e for rotating the shaft 17–c. The shaft 17–c has on its upper end a disc 17–g carrying a coil spring 17–h bearing against a collar 17–i on a cylindrical head 17–j received in the upper end of the coil spring 17–h. A post 17–k rises from the head 17–j and has strengthening ribs 17–l mounted on collar 17–i. On the upper end of the post 17–k there is a rod 17–m normal to the post 17–k which is received in a tubular socket 17–n fixed on the underside of the track 16.

It is to be understood that the rods 17–m of the members M are so related to the sockets 17–n of the tracks 16 as to permit rocking of the tracks 16 on their pivots on the posts 3. Each member M has an ear 17–o to which is attached a chain 16–a rove about a shaft 16–b suitably journaled on the chassis C and having a ratchet controlled head 16–c rotatable by a suitable tool 16–d for fixing the tracks 16 in adjusted positions (FIGS. 1 and 2).

A pair of tracks 18 is pivoted on the rear ends of the tracks 16, respectively (FIGS. 1 and 2). Each track 18 is connected with an operating lever 18–a by a lug 18–b carrying a pin 18–c in a slot 18–d in the lever 18–a (FIG. 2). The two levers 18–a are pivoted on the arch 13 (FIGS. 1 and 3), and oscillated about their pivots by hydraulic jacks 18–e pivotally mounted on the chassis C. The posts 6 and 7 (FIGS. 1, 2, 14 and 15) have suitable, vertically spaced lugs 19 with pins 19–a for supporting a removable transverse beam (not shown) for carrying the tracks 18 in adjusted positions, the pins 19–a being received in sockets (not shown) in the bottom of said removable beam, to prevent lateral movement of the tracks 18. Each track 18 has a chain 18–f attached thereto and rove about a shaft 18–g suitably journaled on the chassis C, and having a ratchet-controlled head 18–h rotatable by a suitable tool (not shown) for fixing the tracks 18 in adjusted positions (FIG. 2).

A pair of tracks 20 is fixed on the struts 14 and 15 on the arches 12 and 13. The front ends of the tracks 20 are so disposed as to register with the rear ends of the tracks 18 when the tracks 18 are adjusted in their uppermost positions. These fixed tracks 20 extend rearwardly slightly beyond the rear ends of the struts 14 and 15. On the rear ends of the tracks 20, a pair of tracks 21 is pivoted, respectively (FIGS. 1 and 3).

A pair of posts 22 and 23 is mounted on the sides of the chassis C, respectively, toward the rear ends of the tracks 21 (FIGS. 1 and 3). A second pair of posts 24 and 25 is mounted on the sides of the chassis C, respectively, spaced rearwardly from the posts 22 and 23, and adjacent the rear ends of the tracks 21. A strut 26 connects the posts 22 and 24 (FIG. 3) and a strut 27 connects the posts 23 and 25 (FIG. 1). Projecting forwardly from the posts 22 and 23, respectively, there is a pair of brackets 28, each of which is supported by a post 28–a mounted on the chassis C. Each bracket 28 has pivoted thereon a hydraulic jack 29 which is pivotally attached to a track 21, for oscillating the track 21 about its pivot. Each track 21 has fixed on its under-side adjacent its rear end a depending bracket 30 consisting of an L-beam having a vertical portion 30–a and a horizontal portion 30–b (FIGS. 1, 3 and 12). Each portion 30–b has an orifice 30–c in which is received one of the pins 30–d on the struts 26 and 27. Each of the struts 26 and 27 has an upstanding ear 30–e against which the portions 30–a of the brackets 30 are received. The pins 30–d and the ears 30–e prevent lateral movement of the tracks 21 when they are supported on the struts 26 and 27.

A pair of posts 31 and 32 (FIGS. 1 and 4) is mounted on the sides of the chassis C, respectively, at the rear end of the trailer, and a second pair of posts 33 and 34 is mounted on the sides of the chassis C, respectively, spaced forwardly of the posts 31 and 32, respectively. The posts 31 and 33 are connected by a strut 35 (FIG. 1) and the posts 32 and 34 are connected by a strut 36 (FIG. 4). A strut 37 (FIG. 1) extends forwardly from the post 33 and is supported at its forward end by a post 37–a mounted on the chassis C immediately rearwardly of the post 25 and inclined rearwardly (FIG. 1). An L-shaped strengthening bracket 37–b is provided at the junction of strut 37 and post 37–a. A second rearwardly inclined post 37–c is mounted on the chassis C to support the strut 37. A strut 38 (FIG. 4) extends forwardly from post 34 and is supported at its forward end by a post 38–a mounted on the chassis C immediately rearwardly of the post 24, and inclined rearwardly (FIGS. 3 and 4). An L-shaped strengthening bracket 38–b is provided at the junction of strut 38 and post 38–a. A second rearwardly inclined post 38–c is mounted on the chassis C to support strut 38 (FIG. 4).

From the foregoing description of the fixed elements 22 to 38, it will be understood that my improved trailer is provided with a stable structure carried by the chassis C and extending from the rear end to substantially the mid-point of the length of the chassis C.

The rear end posts 31 and 33 are connected at their tops by a beam 39 (FIG. 1) and the rear end posts 32 and 34 are connected at their tops by a beam 40 (FIG. 4).

Supported by these beams 39 and 40 there is a rear gate G which has one end G–1 pivoted on beam 40 by a hinge G–2. A hydraulic jack G–3 is pivoted on the strut 36 (FIG. 4) and the gate G for raising and lowering the gate G. The gate G is locked in lowered position by a keeper G–4 on the beam 39 (FIG. 1).

A pair of arms 41 is pivoted on the rear faces of the posts 31 and 32, respectively. Each arm 41 has a pair of relatively spaced sockets 41–a. The gate G also has a pair of sockets G–5 on its rear face at its ends, respectively (FIGS. 1 and 4). These sockets 41–a and G–5 are adapted to carry therein a removable beam 42 for supporting the rear ends of a pair of removable tracks 43 having their forward ends removably mounted on the gate G. The arms 41 have chains 41–b attached to beams 39 and 40, respectively, to support arms 41 when they are extended rearwardly, and latches 41–c pivoted on posts 31 and 32, respectively, to hold the arms 41 in retracted position.

Post 24 has a rearwardly extending horizontal beam 24–a connected to the strut 38–a (FIG. 3) and carrying at its rear end a short post 24–b. A beam 24–c is mounted on the tops of the posts 24 and 24–b inclined downwardly rearwardly. Post 25 has a rearwardly extending horizontal beam 25–a connected to strut 37–a (FIG. 1) and carrying at its rear end a short post 25–b. A beam 25–c is mounted on the tops of posts 25 and 25–b inclined downwardly rearwardly.

A rear bridge 44 is removably mounted on the first set of beams 24–c and 25–c (FIGS. 1 and 3) having one end 44–a pivoted on beams 24–c by a hinge 44–b. A hydraulic jack 44–c (FIGS. 3 and 13) is pivoted on the beam 24–a and the bridge 44 for raising and lowering the bridge 44. A coil spring 44–d (FIGS. 3 and 13) is provided to bias the bridge 44 into lowered position. The bridge 44 has at its forward edge 44–e a stop flange 44–f and brackets 44–g carrying a cam-controlled shaft 44–h for the tie-down chains (not shown). The bridge 44 is locked in lowered position by a keeper 44–i on the beam 25–c (FIG. 1).

A second pair of beams 45 are carried by struts 37 and 38, respectively, immediately rearwardly of the beams 24–c and 25–c (FIGS. 1 and 3), on which the bridge 44 can be mounted as on beams 24–c and 25–c. A third pair of beams 46 and 46–a are mounted immediately forwardly of beams 24–c and 25–c beam 46 being carried by posts 22 and 24 (FIG. 3) and beam 46–a by posts 23 and 25 (FIG. 1). The bridge 44 can be mounted on beams 46 and 46–a as on the other described beams.

Two skids S are provided to alternatively connect the gate G with the bridge 44 when the bridge 44 is mounted on the middle set of beams 24–c and 25–c, and the forward set of beams 46 and 46–a, and to connect the gate G with the tracks 21 when tracks 21 are supported by brackets 30 on struts 26 and 27. The forward ends of these skids S are provided with suitable means (not shown) for attaching the skids S to the rear edge of the bridge 44 and to the rear ends of the tracks 21, the rear ends of the skids S being supported by the gate G. When the bridge 44 is mounted on the rear beams 45, a pair of shorter skids (not shown) can be used to connect the gate G with the bridge 44.

Posts 6 and 8 have mounted on their upper ends a beam 47 and posts 7 and 9 have mounted on their upper ends a beam 47–a. A forward bridge 48 is removably mounted on the beams 47 and 47–a, having one end 48–a pivoted on beams 47 by a hinge 48–b. An hydraulic jack 48–c is pivoted on strut 10 and bridge 48 for raising and lowering the bridge 48. A coil spring 48–d is provided to bias bridge 48 into lowered position. The bridge 48 has at its forward edge 48–e a stop flange 48–f and brackets 48–g carrying a cam-controlled shaft 48–h for the tie-down chains (not shown). The bridge 48 is locked in lowered position by a keeper 48–i on the beam 47–a (FIG. 1).

I provide means for stowing the bridge 48, when it is not in use (FIGS. 2, 16, 17 and 18). A bracket 6–a (FIG. 2) projects forwardly from the post 6 and carries an upwardly extending post 6–b. A second bracket 3–e projects rearwardly from the post 3 which is connected to the post 6 by the strut 3–c, and has therein an orifice 3–f. As illustrated in FIG. 16, the bridge 48 can be mounted edgewise on the brackets 6–a and 3–e, the hinge 48–b at one end of the bridge 48 being slipped over the post 6–b and a locking pin 3–g being passed through one of the sleeves of the keeper 48–i at the other end of the bridge 48 and the orifice 3–f of the bracket 3–e. To stabilize the bridge 48 when it is thus mounted, I provide a bracket 3–h mounted on the said strut 3–c (FIG. 18), midway between posts 6 and 3, and a bolt 3–i passed through bracket 3–h and a hole 48–j in the bridge 48. The bolt 3–i has a head 3–j bearing upon the bracket 3–h and a nut 3–k bearing upon the bridge 48 to clamp the bridge 48 to the strut 3–c and brackets 3–e and 6–a.

The tracks 20 (FIGS. 1 and 3) have pivoted at their rear ends a pair of skids 20–a. These skids 20–a, when in retracted position, lie on the tracks 20, and, when in extended position, have their forward ends removably fastened to the rear edge of the bridge 48, by any suitable means (not shown), to connect tracks 20 with the bridge 48 (FIG. 1).

Having described the structural details of my improved trailer, I will now describe its use and operation.

As shown in FIG. 1, the trailer is loaded with four large size automobiles I, II, III and IV, and a station wagon V. It is to be understood that all five vehicles are loaded through the rear end of the trailer, Nos. I, III and IV being backed on the trailer, and Nos. II and V being driven on forwardly.

The method of loading is as follows:

To load car I, the bridges 44 and 48 and the gate G are removed, skids 20–a are lowered onto the tracks 20, and tracks 16, 18, 20 and 21 are horizontally aligned. Car I is backed into position at the forward end of the lower trackway and dogged down by the usual pull-down means, depressing the hinged tracks C–4 to depress the rearwardly extending end of the car I. It is to be understood that car I is moved from the ground to the lower trackway over ordinary skids used for loading carriers.

To load car II, it is driven up the ordinary loading skids from the ground and to the rear end of the lower trackway and dogged down by the usual pull-down means, depressing hinged tracks C–8 to depress the rearwardly extending end of car II.

To load car III, gate G is mounted and skids S are placed to connect gate G and tracks 21. The skids from the ground are mounted on gate G. Car III is backed up onto gate G, and along skids S, tracks 21, 20, 18 and 16, until its rear wheels are positioned on adjusted tracks 5 at the forward end of the intermediate trackway where they are dogged down, the front wheels of car III resting on tracks 18. Tracks 18 are then depressed by chains 18–f until they just clear the top of car I and are then fixed in adjusted position by the adjustable transverse beam supported on the lugs 19. The front wheels of car III are then dogged down.

It is obvious that by proper vertical adjustment of the tracks 5, the forwardly extending end of car III can be adjusted in a plurality of vertical positions according to the character of the particular vehicle placed at the forward end of the intermediate trackway. This novel feature of my improved trailer is of considerable value as it provides means whereby a variety of vehicles, trucks, busses, station wagons etc. can be loaded in that part of the trailer. It is obvious that, if the length of car III permits, tracks 5 may be dispensed with, the rear wheels resting on the tracks 16.

To load car IV, bridge 48 is then mounted and skids 20–a are raised and attached thereto. It will be noted (FIG. 1) that depression of tracks 18 lowers the rearwardly extending end of car III sufficiently for mounting the bridge 48 above that end of car III with proper clearance. Car IV is backed up onto gate G, and along skids S, tracks 21 and skids 20–a until its rear wheels are positioned on bridge 48 where they are dogged down, the front wheels resting on tracks 21.

It will be noted (FIGS. 1 and 2) that the hinged tracks 16 and the tracks 18 hinged thereto can be vertically adjusted by vertical adjustment of the spring members M supporting the tracks 16. In this way, car III can be properly positioned so that its rearwardly extending end is fitted between the rearwardly extending portion of car I and the forwardly extending portion of car IV with the proper clearance between these three cars.

To load car V, the bridge 44 is mounted, skids S are placed to connect the bridge 44 and the gate G. Car V is driven up onto the gate G, and along skids S until its front wheels are positioned on the bridge 44 and its rear wheels on the skids S.

It will be noted (FIG. 1) that if car IV is a particular type of vehicle as to require, tracks 21 can be depressed to depress the rearwardly extending end of car IV until it just clears the top of car II, thereby providing sufficient space to accommodate bridge 44 and the forwardly extending end of car V above car IV.

By use of the arms 41, beam 42 and tracks 43, the upper trackway for car V can be elongated to a degree sufficient to load a particular vehicle requiring such an elongated trackway.

It will be noted (FIGS. 1 and 3) that the rear bridge 44 can be mounted selectively on the middle set of beams 24–c, 25–c, the rear set of beams 45, or the front set of beams 46, 46–a, thereby providing means for suitable adjustment of the length of the upper trackway. When the bridge 44 is mounted on the beams 45, skids (not shown) of suitable length can be used to connect the bridge 44 and the gate G.

From the foregoing description of loading the trailer, it is obvious that, if desired, a sixth car could be loaded on the top of the tractor T by providing removable tracks having their rear ends mounted, as tracks 5, at the forward end of the intermediate trackway, and their front ends suitably mounted on the top of the tractor T, the sixth car being driven along the intermediate trackway, after car I has been loaded.

It is also obvious that, if desired, one large car and two small cars can be loaded on the lower trackway instead of the two large cars shown in FIG. 1.

Thus it will be seen, in view of the foregoing, that it is possible to load seven cars, carrying six on the trailer and the seventh on the tractor.

Having described my invention, what I claim is:

1. In an automobile carrier, the combination of a chassis; a trackway on said chassis; a second trackway supported on said chassis above said first trackway; a pair of posts on said chassis on which the forward end of said second trackway is supported; a transverse beam fixed on the tops of said posts; a transverse beam removably and adjustably mounted on said posts forwardly of said fixed beam; adjustable mounting means for said adjustable beam, comprising a bracket mounted on the front of each of said posts and having a plate having a plurality of bolt holes therethrough, and a socket on the top of said bracket with an upstanding ear having a plurality of bolt holes therethrough, said adjustable beam having a bolt hole in each of its ends which can be made to register with a pair of said bolt holes in said plates and in said ears, for passage of bolts through said holes to fix said adjustable beam in adjusted positions in said brackets; and a pair of tracks hinged on said fixed beam and supported on said adjustable beam for vertical adjustment, in alignment with said second trackway, adapted to elongate forwardly said second trackway.

2. In an automobile carrier, the combination of a chassis; a trackway on said chassis; a second trackway supported on said chassis above said first trackway; a third trackway supported on said chassis above said second trackway; a pair of posts on said chassis; a gate removably mounted on said posts, on which the rear end of said third trackway is supported; a transverse beam removably and adjustably mounted on said posts rearwardly of said third trackway; adjustable mounting means for said adjustable beams, comprising a pair of arms hingedly mounted on the rear faces of said posts, respectively, each of said arms having a plurality of sockets thereon; means adapted to fix said arms in adjusted positions relative said gate, said beam being received alternatively in pairs of said sockets on said arms; and a pair of tracks removably mounted on the rear end of said third trackway and said beam, for elongating said third trackway rearwardly.

References Cited in the file of this patent
UNITED STATES PATENTS

| | | |
|---|---|---|
| 1,875,977 | Beckwith | Sept. 6, 1932 |
| 2,684,264 | Demos | July 20, 1954 |
| 2,710,768 | Francis | June 14, 1955 |
| 2,778,672 | Huebshman | Jan. 2, 1957 |
| 2,841,436 | Stuart | July 1, 1958 |
| 2,848,270 | Risner | Aug. 19, 1958 |
| 2,860,910 | Risner | Nov. 18, 1958 |
| 2,908,527 | Risner | Oct. 13, 1959 |

FOREIGN PATENTS

| | | |
|---|---|---|
| 661,682 | Great Britain | Nov. 28, 1951 |